Nov. 13, 1945.   K. W. COUSE   2,388,955
VARIABLE SPEED POWER TRANSMISSION
Filed April 1, 1944   7 Sheets-Sheet 1

INVENTOR
Kibbey W. Couse
BY
A. D. T. Libby
ATTORNEY

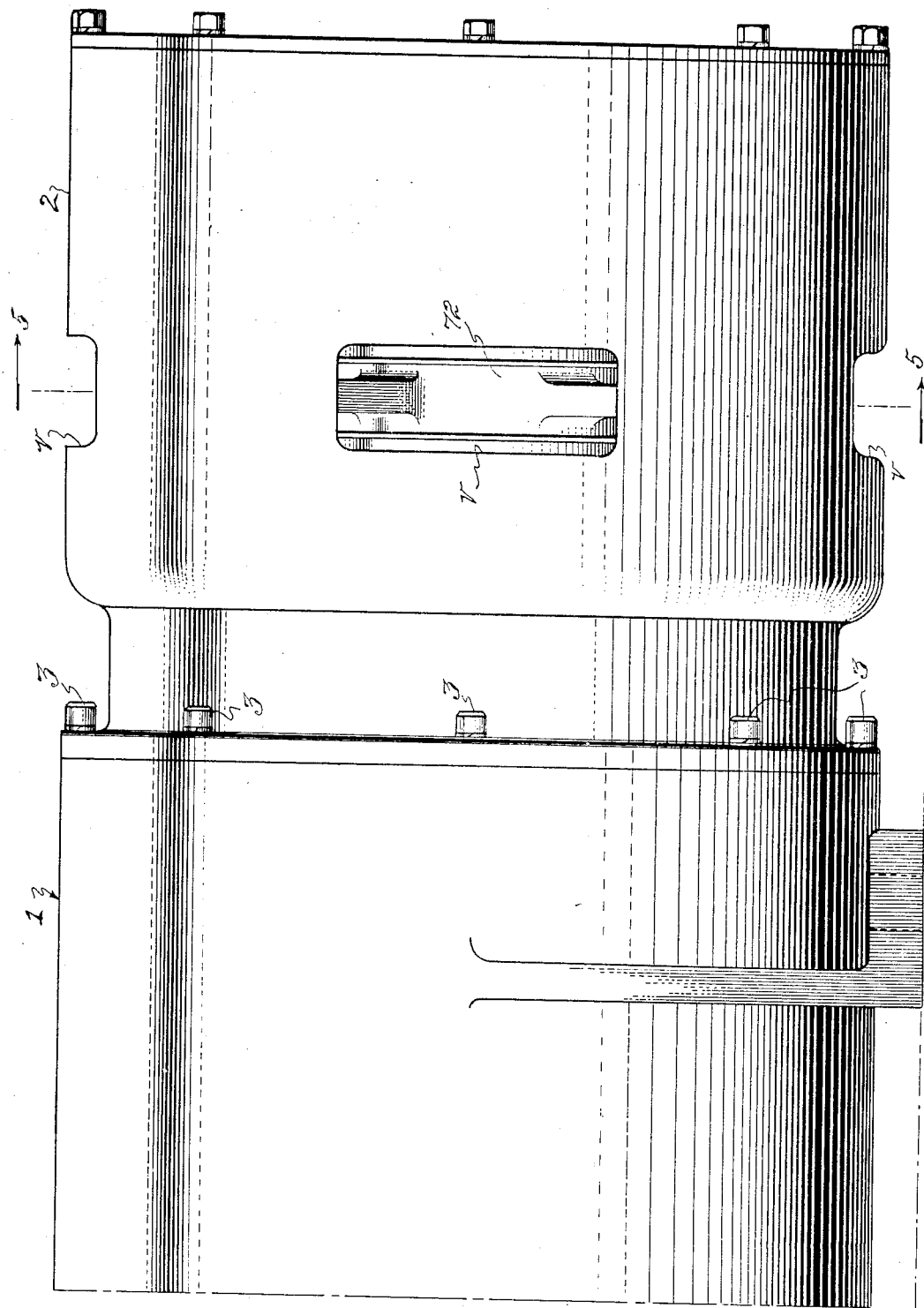

Nov. 13, 1945.　　　　　K. W. COUSE　　　　　2,388,955
VARIABLE SPEED POWER TRANSMISSION
Filed April 1, 1944　　　　7 Sheets-Sheet 3
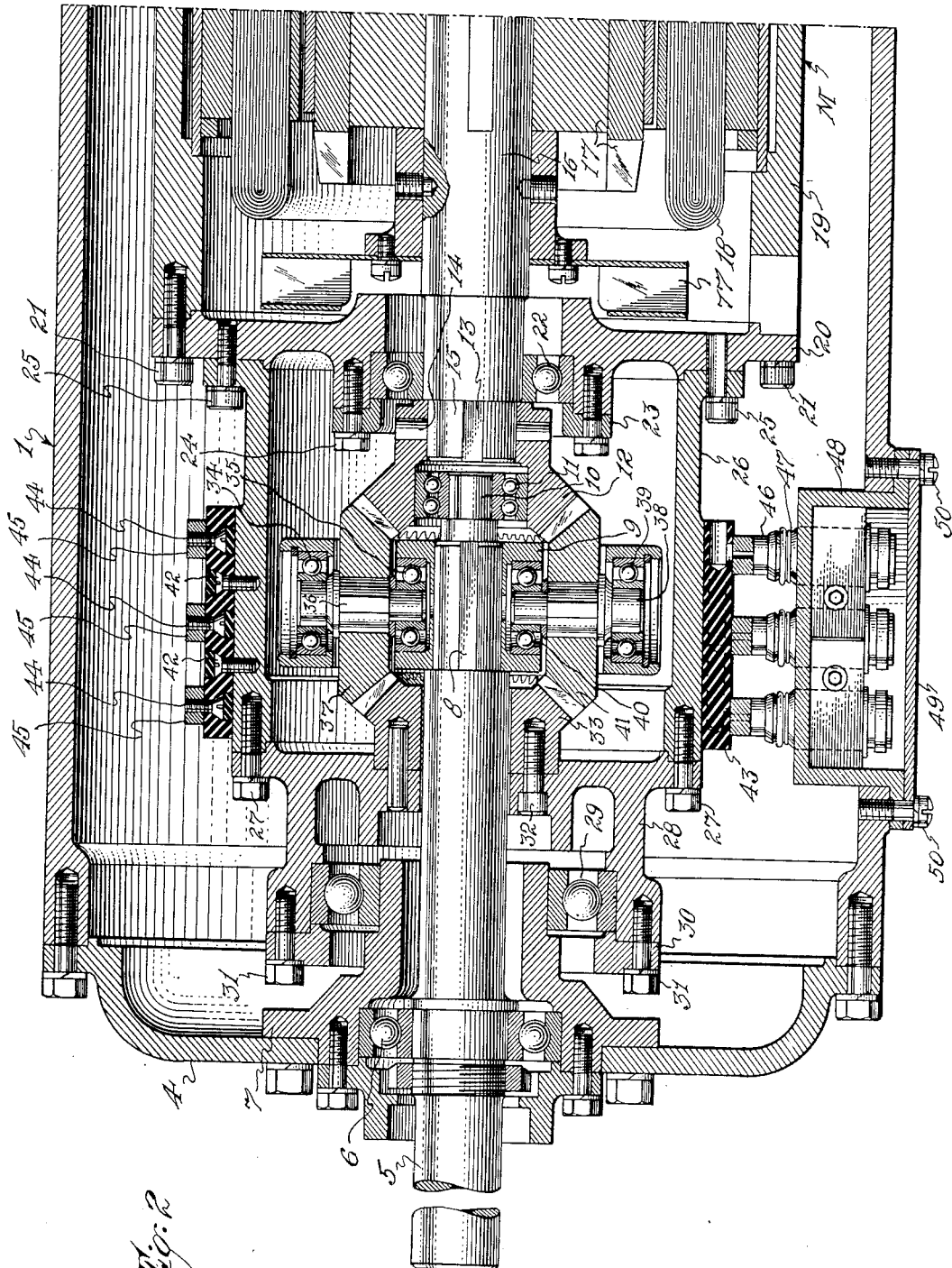

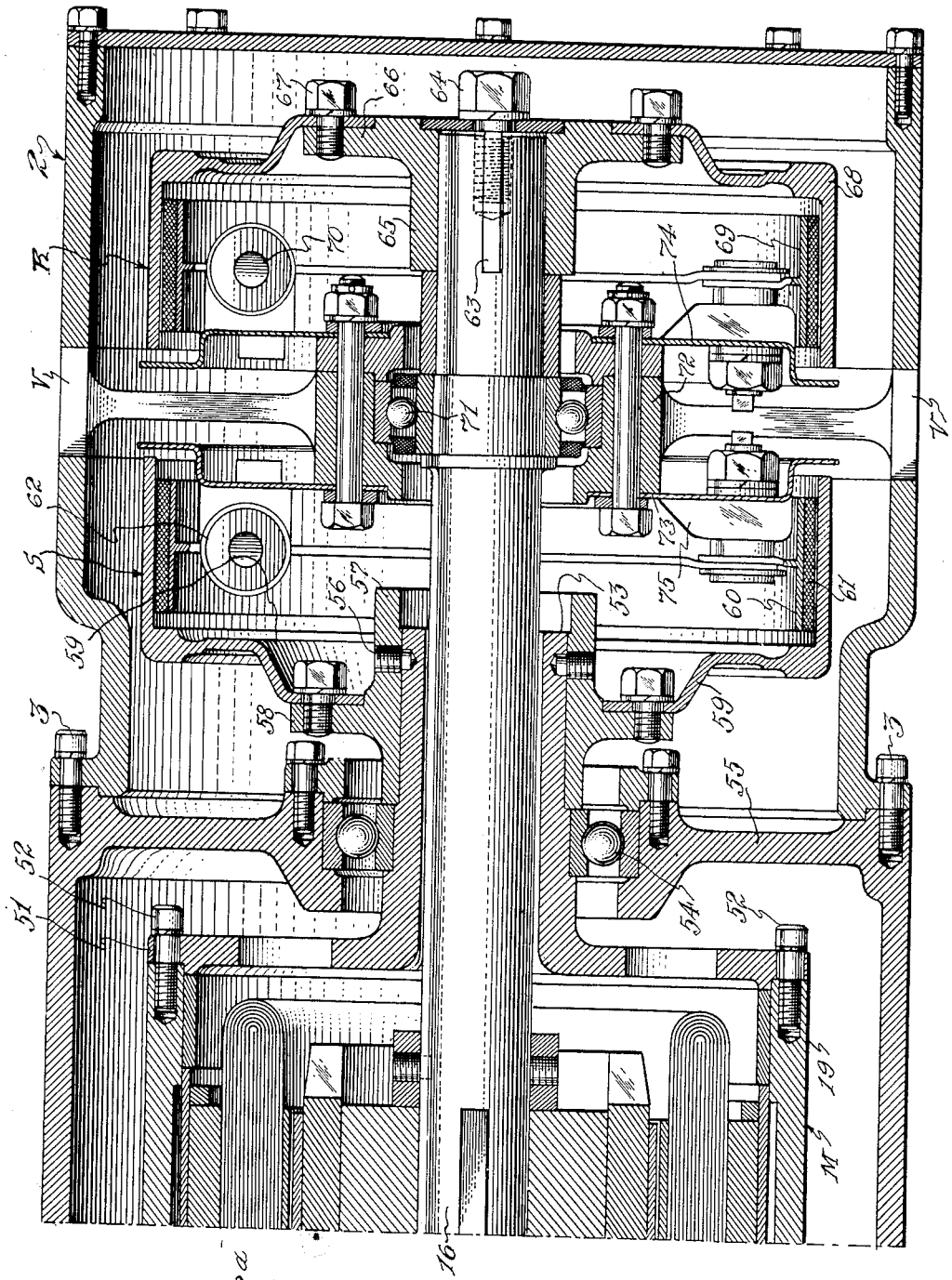

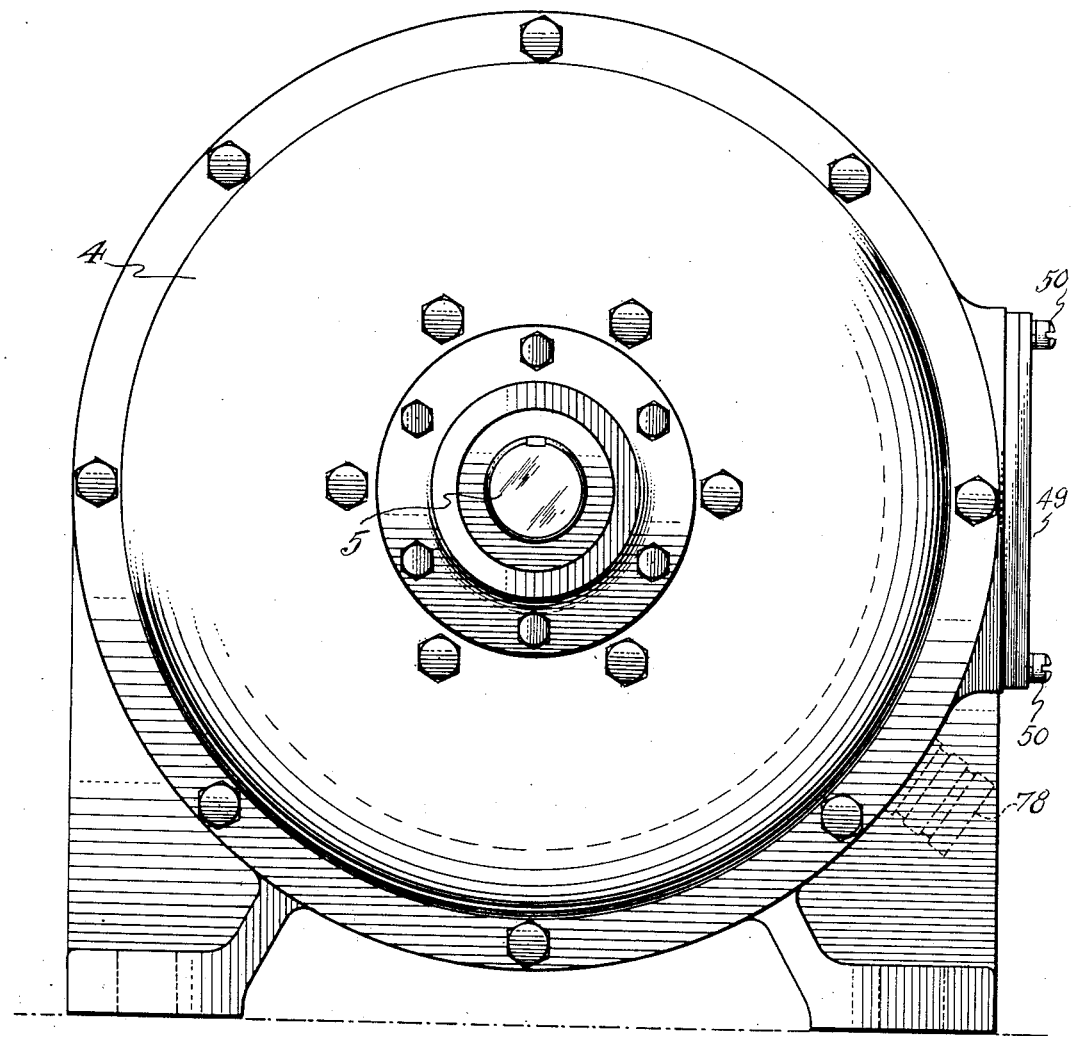

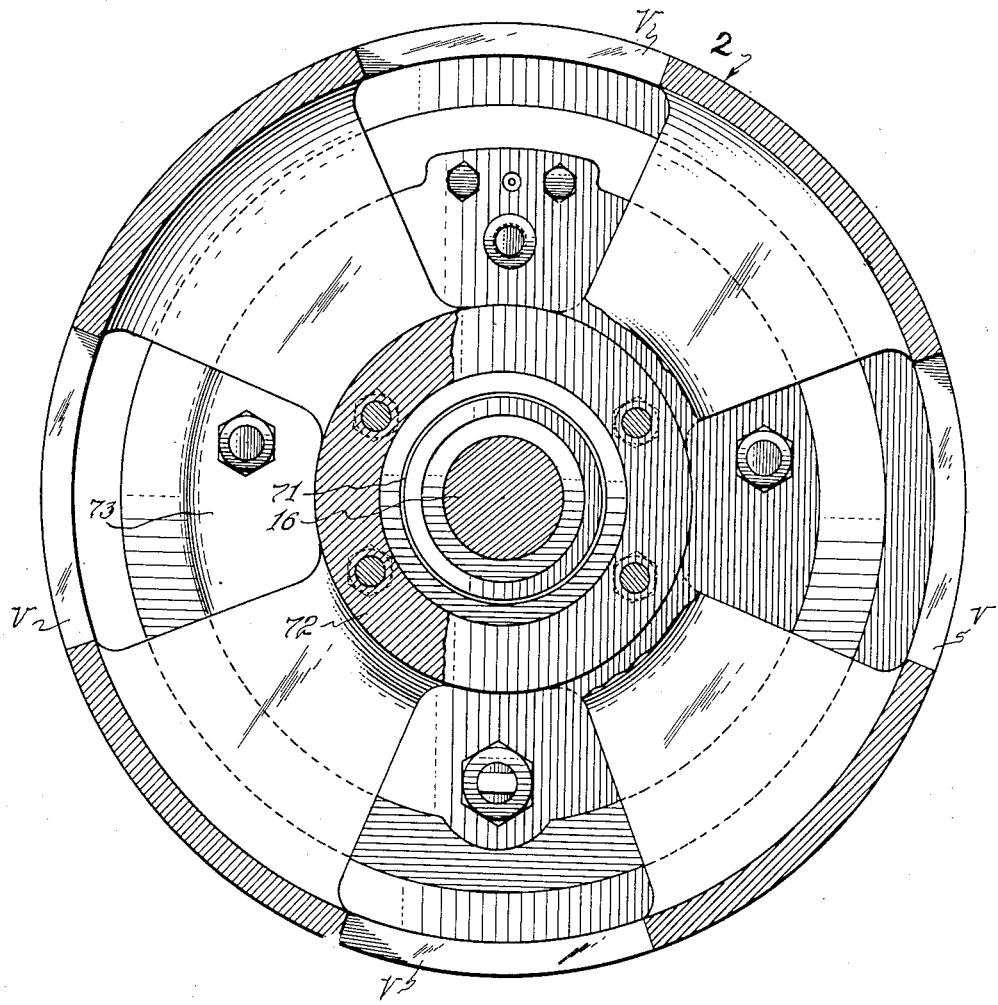

Patented Nov. 13, 1945

2,388,955

UNITED STATES PATENT OFFICE 2,388,955

VARIABLE-SPEED POWER TRANSMISSION

Kibbey W. Couse, Newark, N. J.

Application April 1, 1944, Serial No. 529,061

13 Claims. (Cl. 172—36)

This invention relates to a variable speed power transmission and has for its principal object the provision of a unitary structure which has an output or load shaft extending from one end of the structure for connection to any desired mechanism having a rotary part, the speed of which needs to be controlled over a wide range in either right or left-hand rotation.

Another object of my invention is to provide a power transmission which will accomplish the principal object and which is comparatively simple as compared with prior-art structures with which I am familiar.

My invention will be readily understood by reference to the annexed drawings, wherein:

Figure 1a is a continuation of the structure shown in Figure 1.

Figure 2 is a vertical, sectional view of Figure 1, some of the parts being shown in elevation.

Figure 2a is a continuation of Figure 2 through Figure 1a.

Figure 3 is a view of the left-hand end of Figure 1.

Figure 5 is a view on the line 5—5 of Figure 1a.

Figure 1:
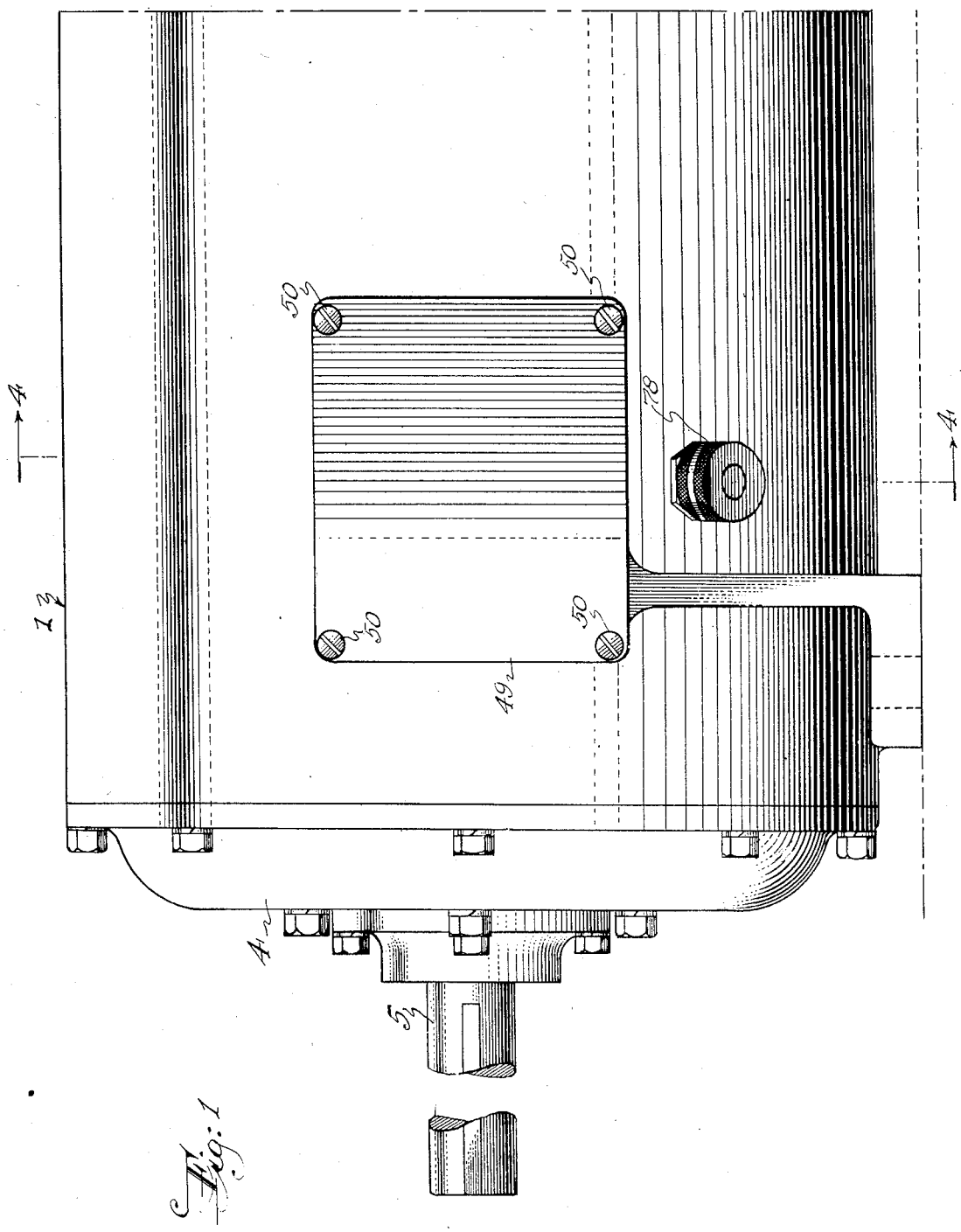
Figure 1 is a side elevation of one part of the unitary structure.
Figure 4:
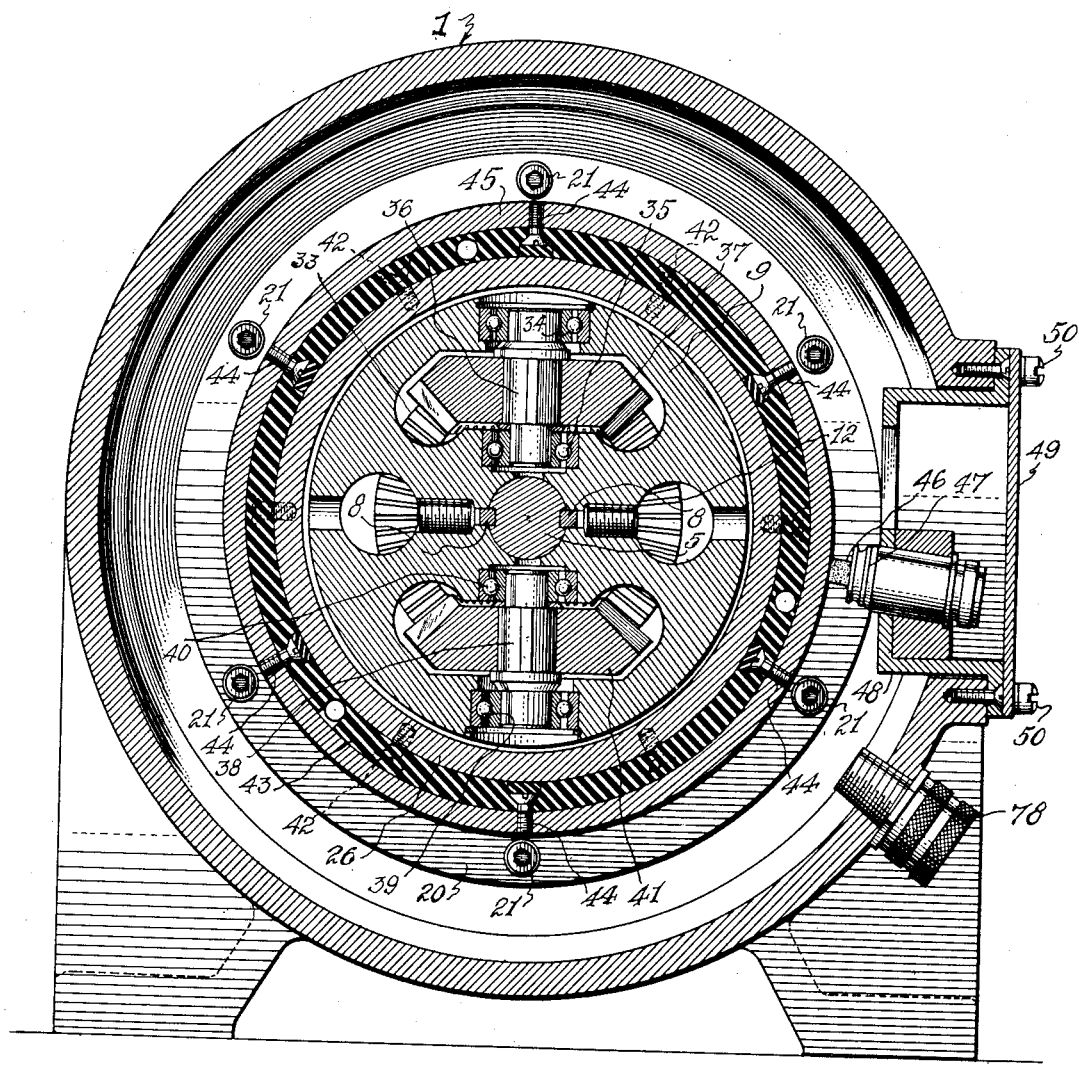
Figure 4 is a view on the line 4—4 of Figure 1.

In the various views, wherein like numbers refer to corresponding parts, 1 is an elongated housing having an auxiliary housing extension 2 fastened to 1 by any satisfactory means as by screw studs 3. An end bearing plate 4 supports one end of an output or load shaft 5 by means of a bearing 6 carried in the member 7 fastened to the end plate 4. The inner end of the shaft 5 is fastened as by keys 8 to a framework 9 and has its extremity 10 carried by a bearing 11 which is positioned in a bevel-type gear 12 that is fastened by keys 13 and pins 14 to the extremity 15 of a shaft 16 to which is fastened a rotor structure 17 of a motor M having a stator or field winding 18.

The frame 19 of the motor M has an end plate 20 fastened thereto in any satisfactory manner as by a plurality of screw studs 21. The plate 20 carries a bearing 22 which is held in place by a plate 23 and screw studs 24. Fastened to the end plate 20, as by screw studs 25, is a supplemental housing 26. Fastened to the opposite end of the housing 26, as by screws 27, is a bearing plate 28 which carries a bearing 29 held in place by a plate 30 and screw studs 31. Also fastened to the supplemental bearing plate 28, as by screw studs 32, is a bevel gear 33 which is positioned in alignment with and opposite to the bevel gear 12.

The framework 9 carries on one side of the shaft 5, a pair of bearings 34 and 35 which support a stub shaft 36 that is keyed to a bevel-type gear 37. The framework 9 also carries directly opposite the stub shaft 36, another similar stub shaft 38 supported on bearings 39 and 40. Keyed to the stub shaft 38, is another bevel gear 41. The gears 12, 33, 37 and 41 are all in mesh, forming a differential-type group of bearings to which reference will be later made.

The supplemental housing 26 has an outer annular surface to which is fastened, as by screws 42, a ring insulator 43. To this insulator are fastened, as by screws 44, contact or slip rings 45, three being used for a three-phase motor. Contacting with the rings 45, are suitable brushes 46 that are carried in holders 47 positioned within a junction box 48 closed by a cover 49 held in place by screws 50.

The motor frame 19 has another end bearing plate 51 fastened to the frame 19 by screw studs 52. The end plate 51 has a projecting end 53 which supports one race of a bearing 54, the outer race being carried in a housing plate 55. To the projecting end 53 is fastened, as by set screws 56, a collar 57 having a flange 58 to which is fastened a brake drum 59. Mounted within the brake drum 59 are brake shoes 60 having friction material 61 thereon and operated by a hydraulic brake cylinder 62. At the extremity of the shaft 16, there is fastened, as by keys 63 and screw studs 64 in the end of the shaft 16, a collar 65 having a flange 66. To the flange 66 is fastened, as by set screws 67, a brake drum 68 similar to the drum 59. Mounted within the drum, are brake shoes 69 operated by a hydraulic cylinder 70 similar to the cylinder 62. This last-mentioned end of the rotor shaft 16 is carried by a bearing 71, the outer race of which is positioned in a frame member 72 which also acts as a support for plates 73 and 74. The plates 73 and 74 act, to some extent, as housing members for their respective brakes and also carry fan blades 75 and 76 for cooling the brakes. It may be mentioned that the motor M also carries a fan 77 for assisting in cooling the motor, current to which is brought by a cable through the bushing 78 into the junction box 48. Ventilation is provided through the openings V.

In the operation of the transmission mechanism just described, and assuming that the three-phase motor is to be operated from a 60-cycle circuit and that the synchronous speed is 1800 R. P. M., and that the brake S— which is connected through the means described to the field of the motor or the stator— is set so as to lock the stator or field 18 of the motor, this means that the gear 33, which is mechanically connected to the supplemental housing 26 that in turn is fastened to the stator frame, is held stationary. Under this condition, the rotor 17 will turn at substantially full speed (1800 R. P. M.), assuming that there is no load at the output shaft 5. This means that the gear 12, fastened to the shaft 16, turns at the same speed, but the gears 37 and 41, carried on the stub shafts 36 and 38, will revolve around the gear 33 which is held in rotation. By operating the brake R, the speed of the rotor may be varied very gradually and smoothly from 1800 R. P. M. down to zero.

When the stator brake S is free and the rotor brake R is set to lock the rotor from turning, the output shaft 5 will be turned in reverse direction, since the gears 37 and 41 will now rotate about the fixed gear 12 carried by the rotor shaft 16, and as the brake S is operated, the speed may be varied from 1800 down to zero. Therefore, by varying the action of the brakes R and S, a difference in speed over a wide range in either direction of rotation of the output shaft may be secured. Thus the structure is one in which a variable speed may be obtained for a reasonable length of time, and one in which a quick reversal may be obtained, all with a smooth running action of the output shaft 5.

It will be obvious that many of the mechanical details may be varied without departing from the spirit of my invention or the scope of the appended claims.

What I claim is:

1. A variable speed power transmission comprising, an elongated housing unit, an induction motor positioned within the housing and having what is usually termed a stator and rotor, both the stator and rotor being mounted for rotation within the housing, an output or load shaft extending from one end of the housing, both the stator and rotor being connected to the output shaft through a differential type of gearing, and means for retarding the rotation of either the stator or rotor from maximum to zero speed for the purpose described.

2. A variable speed power transmission comprising, an elongated housing unit, an induction motor positioned within the housing and having what is usually termed a stator and rotor, both the stator and rotor being mounted for rotation within the housing, an output or load shaft extending from one end of the housing, the stator being connected to one of the gears of a differential-acting group of gears, while the rotor shaft is connected to a gear oppositely positioned in said group from the stator gear, and the output shaft is connected to a framework carrying oppositely disposed gears rotatably mounted independently in said framework and geared to the stator and rotor shaft gears, and means for retarding the rotation of either the stator or rotor from maximum to zero speed for the purpose described.

3. A variable speed power transmission comprising, an elongated housing unit, an induction motor positioned within the housing and having what is usually termed a stator and rotor, both the stator and rotor being mounted for rotation within the housing, an output or load shaft extending from one end of the housing, a group of four bevel-type gears geared together, two oppositely disposed gears being fastened to individual stub shafts rotatably carried in a framework, one of the other two gears being connected to a part fastened to the stator structure, while the remaining gear is fastened to the rotor shaft, the output shaft being fastened to said gear framework, and means for retarding the rotation of either the stator or rotor from maximum to zero speed for the purpose described.

4. A variable speed power transmission comprising, an elongated housing unit, an induction motor positioned within the housing and having what is usually termed a stator and rotor, both the stator and rotor being mounted for rotation within the housing, an output or load shaft extending from one end of the housing, both the stator and rotor being connected to the output shaft through a differential-type of gearing, a pair of brakes carried in spaced relation within a part of the housing, one adapted to apply a braking action to the stator construction, while the other brake is adapted to apply a braking action to the rotor shaft as and for the purposes described.

5. A variable speed power transmission as set forth in claim 4, further defined in that the brakes are in an auxiliary housing fastened to and forming part of the housing unit.

6. A variable speed power transmission comprising a housing, a motor having a wound field and a rotor excited thereby, both the field and rotor being mounted for rotation within the housing, an output shaft extending from one end of the housing, a group of four gears arranged in a differential style, the field of the motor being operatively connected to one of said gears, the rotor being connected to a gear of the group opposite to the gear connected to the field, while the output shaft is connected to a framework carrying the other two gears, each being independently mounted on its own shaft, and means for independently controlling the speed of rotation of both the field and rotor for the purposes described.

7. A variable speed power transmission comprising a housing, a motor having a wound field and a rotor excited thereby, both the field and rotor being mounted for rotation within the housing, an output shaft extending from one end of the housing, both the stator and rotor being connected to the output shaft through a differential-type of gearing, and independent brake means for varying the speed of rotation of either the stator or rotor from maximum to zero and also for reversing the direction of rotation of the output shaft.

8. A variable speed power transmission comprising a housing, a motor having a wound field and a rotor excited thereby, both the field and rotor being mounted for rotation within the housing, an output shaft extending from one end of the housing, both the stator and rotor being connected to the output shaft through a differential-type of gearing, and independently operable means carried within a part of the casing for frictionally controlling the speed of rotation of both the stator and rotor and hence the speed of the output shaft as well as the direction of rotation of the output shaft.

9. A variable speed power transmission as set forth in claim 6, further defined in that a pair of brakes are positioned in a part of the housing and adapted to each independently act, one on the field structure and the other on the rotor, to change the speed and relative direction of rotation of the output shaft.

10. A variable speed power transmission as set forth in claim 1, further characterized in that the said gearing is completely enclosed in a supplemental housing which also serves as a connecting means between the stator and one of said gears.

11. A variable speed power transmission as set forth in claim 1, further characterized in that the said gearing is completely enclosed in a supplemental housing which also serves as a connecting means between the stator and one of said gears, and further characterized in that said supplemental housing acts to carry the slip rings for conveying current to the motor.

12. A variable speed power transmission as set forth in claim 4, further characterized in that the brakes are positioned in an auxiliary section of the motor casing.

13. A variable speed power transmission as set forth in claim 4, further characterized in that the brakes are positioned in an auxiliary section of the motor casing, and further characterized in that the rotor shaft at one end of the rotor has a bearing in the main part of the housing and an outboard bearing in the auxiliary section of the housing.

KIBBEY W. COUSE.